March 13, 1951 W. AYRES 2,545,131
GEAR TOY
Filed Jan. 12, 1946 3 Sheets-Sheet 1

INVENTOR
WALDEMAR AYRES
BY
ATTORNEYS

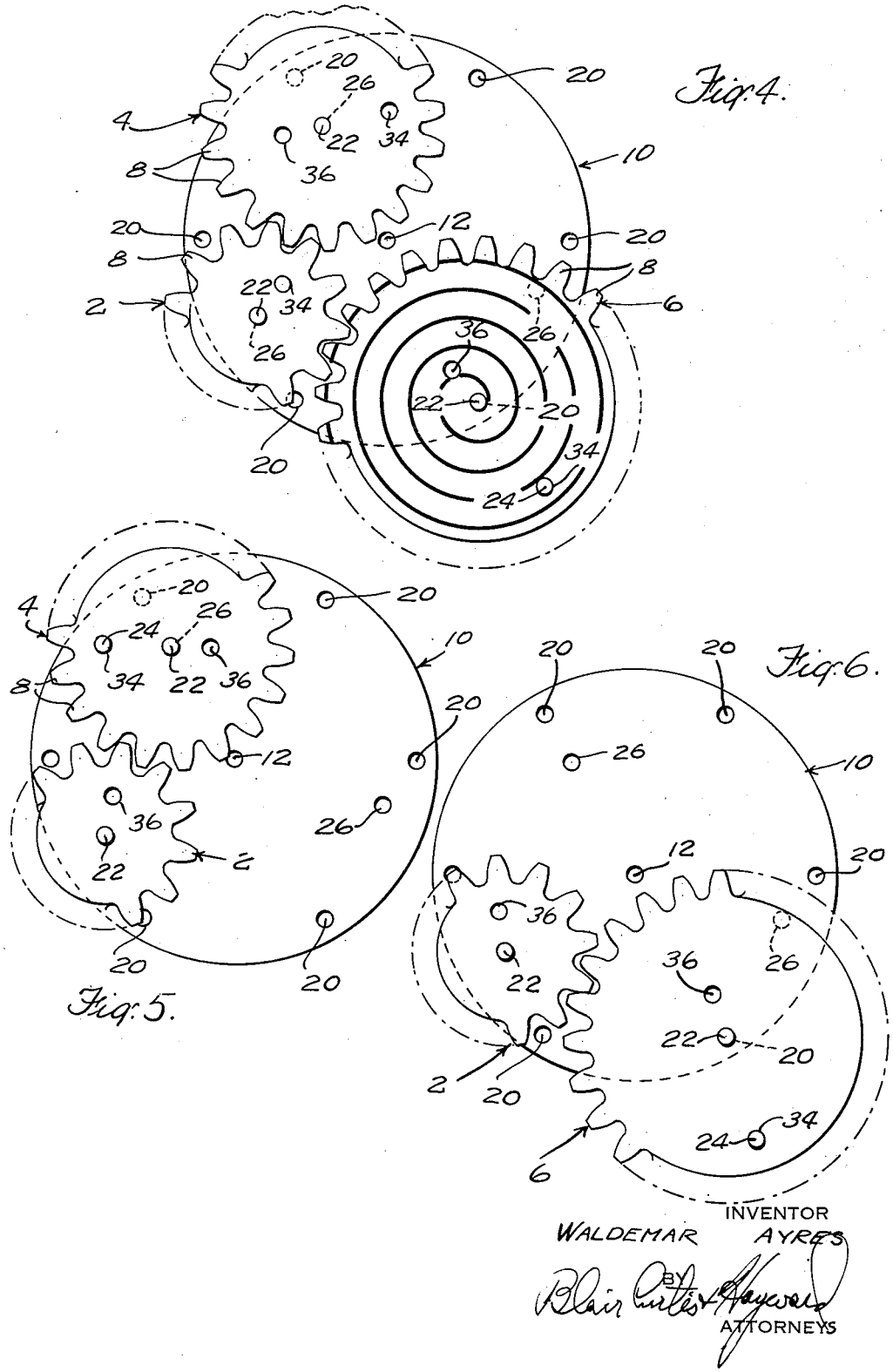

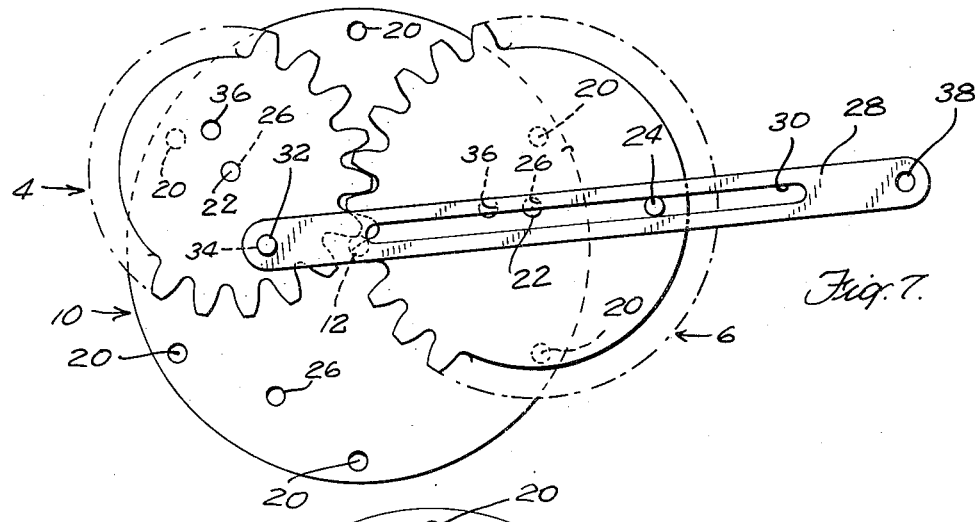
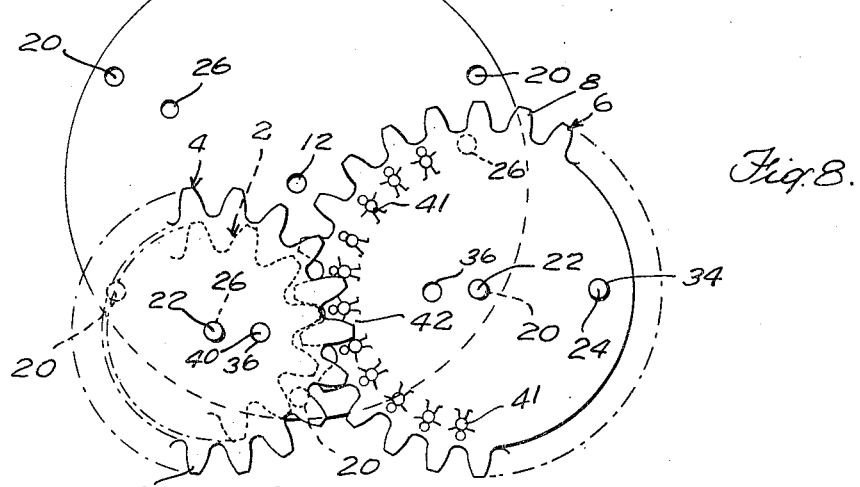
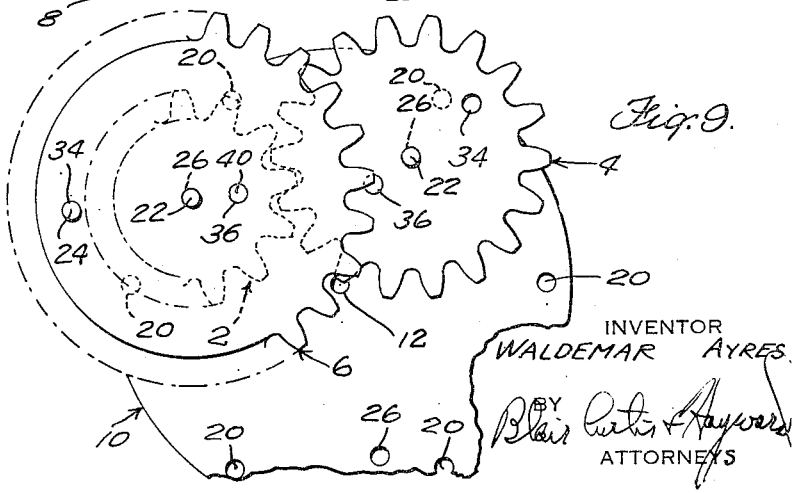

Patented Mar. 13, 1951

2,545,131

UNITED STATES PATENT OFFICE 2,545,131

GEAR TOY

Waldemar Ayres, Kew Gardens, N. Y.

Application January 12, 1946, Serial No. 640,752

9 Claims. (Cl. 35—49)

This invention relates to educational toys and particularly to educational toys of the type intended to teach comparatively young children the basic physical and mechanical principles of simple gearing.

A general object of the invention is to provide an educational toy comprising at least three intermeshable gears of different radii, together with pivot pins, handle pins, preferably a link for producing mechanical movements, and a base on which said gears can be arranged in various gear train combinations and in various actuating relations to the link, which toy can be manufactured so easily and cheaply that it can have wide distribution and yet will permit such a variety of gear combinations and such a variety of mechanical movements and other effects that it will intrigue the interest of the average child, while imparting to him considerable useful mechanical knowledge.

An important feature of the invention is the provision of a base on which the three intermeshable gears of differing radial dimensions can be mounted and which is provided with pivot openings so spaced that all of the different two gear and three gear train combinations possible may be set up on said base by simply locating the pivot pins for the gears in the appropriate pivot pin holes in the base.

Another important feature of the invention is the provision in each gear not only of a central pivot-receiving hole but of a handle-receiving hole, usually sufficiently spaced from the central opening as to give approximately the maximum leverage, and also still another hole in each gear, at a common radial distance from the center in all the gears, which opening, when any two of the gears are concentrically mounted, may be brought into register with the corresponding opening in the other concentrically mounted gear and used to effect an interlocking of the gears by inserting a pin therethrough. This obviously permits still other gear combinations and, as will appear hereinafter, also permits the production of stroboscopic effects.

Still another important feature of the invention is the provision of means for graphically indicating to the child changing phase relations resulting from the turning of intermeshed gears having different radii and therefore different numbers of teeth. Other objects and important features of the invention to which reference has not been specifically directed hereinabove will appear hereinafter when the following description and claims are considered in connection with the accompanying drawings, in which—

Figure 4 is a plan view of another three-gear train combination possible with the toy of the present invention;

Figure 5 shows one of the two-gear train combinations that may be formed with the toy of the present invention;

Figure 6 shows another two gear train combination that may be formed with the toy of the present invention;

Figure 7 illustrates a two gear train having a pin and slot connection with a slotted link to produce an interesting mechanical movement;

Figure 8 shows two of the gears pinned together for rotation in unison, one of the gears being intermeshed with the third gear of the toy; and Figure 9 shows another combination in which a different pair of gears is pinned together and one of them is meshed with the third gear of the toy.

Figure 1:
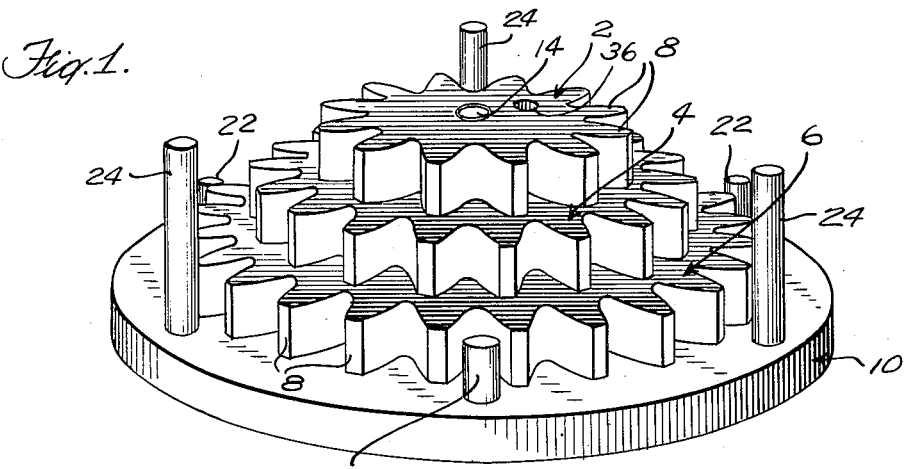
Figure 1 is a perspective view of the toy of the present invention as it is put up to form a commercial unit.

In the illustrative embodiment of the invention the toy, as delivered to the customer, is preferably assembled in the form shown in Figure 1 and comprises three gears 2, 4 and 6 of differing radii but intermeshable with each other, each gear comprising teeth 8 of the same pitch and spacing as the teeth of the other gears. The three gears in the retail assembly are secured in stacked relation upon a circular base 10 which, as more fully shown in Figures 2 to 9 inclusive, has a central-pivot-receiving opening 12 in which, in the retail assembly, a pin 14, of handle pin length, is temporarily secured by sheet metal washers or clips 16 held thereon by nails 18 at each end thereof. Near the periphery of the circular base 10 other pivot-receiving holes 20 are provided which are symmetrically arranged with respect to the central hole 12 and which, in the retail assembly, hold the pivot pins 22 and the handle pins 24 which may be alternately arranged about the gears so that the assembly, as received, will comprise three pivot pins 22, one for each gear and three handle pins 24, one for each gear.

Besides the central hole 12 and the peripheral holes 20, the base 10 is preferably provided with other holes 26 so located thereon that there may be found upon the base pivot-receiving holes spaced apart distances equal to the sums of the pitch radii of any two of the gears, whereby all possible two-gear train or three-gear train combinations may be made. By the expression "sum of pitch radii" is meant the distance apart of the centers of two intermeshing gears of different pitch diameters, it being obvious that, since the gear teeth overlap, the pitch radius of each gear, that is, the distance from the center of the point of tangency of the pitch circles will be less than the overall radius by about one-half the overlap of the gear teeth. These other pivot-receiving holes in the base 10, indicated generally by the reference numeral 26, may be so located that one of the gears mounted on a pivot placed therein may cooperate with a gear placed on a pivot in one of the peripheral openings 20, but preferably, as shown, these pivot-receiving openings 26 will be so located that a pivot in one opening 26 positions the gear thereon in proper relation to mesh with a gear upon a pivot in another opening 26.

Figure 2:
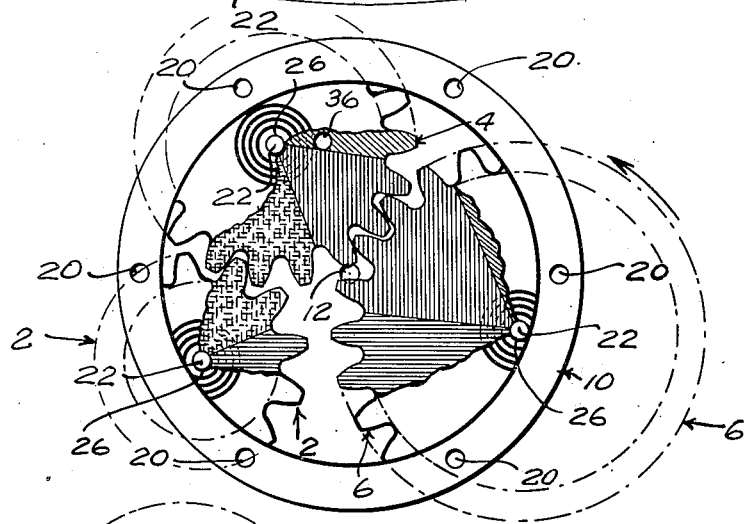
Figure 2 is a partial plan view of the three gears of differing radii assembled in a three-gear train on the base and marked with colored sectors to make graphically evident phase changes resulting from the gear ratios.
Figure 3:
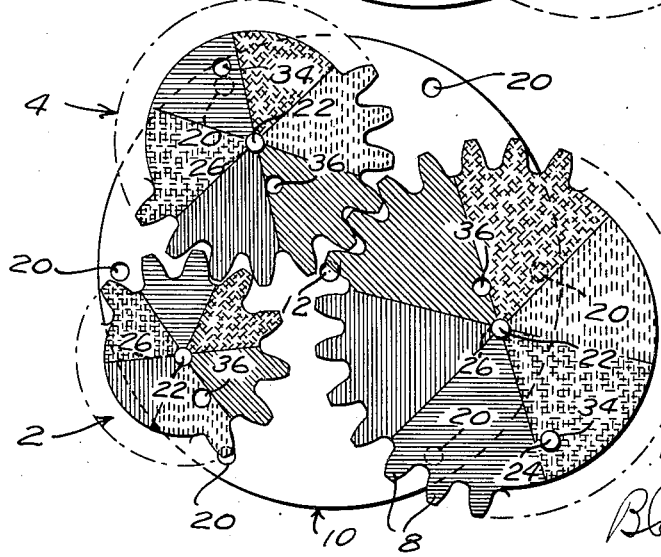
Figure 3 is a view similar to Figure 2 but showing the gears after they have been turned sufficiently to illustrate the difference in phase relations of the colored sectors of the different gears.

As shown in Figures 2 and 3, the gears 2, 4 and 6 are each provided, either on both faces or on the face which is preferably exposed when the gears are mounted on the pivot pins 22, temporarily fixed in the openings 26, with colored sectors. For example, each of the exposed gear surfaces may be divided into six colored sectors, each sector containing one of six primary colors, violet, blue, green, yellow, orange and red, the particular colors and the areas of the sectors may be chosen so that on rapid spinning the disc appears white. If the gears be so initially placed, as shown in Figure 2, that the red sector of gear 6 is opposed to the red sector of gear 4 and the yellow sector of gear 4 is opposed to the yellow sector of gear 2, it will be seen that when the gears are turned, as shown in Figure 3, through a substantial angle of rotation, like colored sectors will no longer be opposed to each other because of the differences in the radii of the gears making gear ratios other than 1:1.

As shown in Figures 2 and 3, the largest gear 6 is placed on the base 10 so that it meshes with the next largest gear 4 and the intermediate gear 4 is so placed that it meshes with the smallest gear 2. In Figure 4 is illustrated another arrangement of the gears in which the largest gear 6 is arranged to mesh with the smallest gear 2 and the smallest gear 2 in turn meshes with the intermediate gear 4. It will be apparent that a third three gear train combination can be made up with the three gears shown and base pivot-receiving holes 26, so spaced as to permit this third combination, are provided.

As shown in Figures 5 and 6, the holes 26 provide for the two two-gear trains there shown, in one of which the small gear meshes with the intermediate gear and in the other of which the small gear meshes with the large gear. It will be obvious that at least one more two-gear train combination can be made and pivot receiving holes 26, so spaced as to permit this third two-gear combination, are provided.

In Figure 7 of the drawings is illustrated the use of the slotted link 28 which forms an additional feature of the toy and which may be attached to the retail assembly shown in Figure 1 in any suitable manner. As shown in Figure 7, the link 28 is of sufficient length so that the slot 30 therein may cooperate with a handle pin 24 on one of the gears of any two gear train when the hole 32 in one end of the link 28 is fitted over either a handle pin or a pivot pin of the other gear of a two-gear train.

It will be apparent that various combinations may be made to effect various mechanical movements of the link 28 and that the pin received in the hole 32 may be located either in the usual handle pin receiving hole 34, usually not far from the gear teeth of each gear, or in a hole 36, located in each gear at a common radial distance from the center of the gear and used ordinarily for pinning two gears together when these holes 36, in two concentrically arranged gears, have been brought into register. Not only may the pivot hole 32 have three different locations on the gear with which it is associated, that is, it may be pivoted on the handle pin located in the regular handle pin hole 34, or on a handle pin located in the gear interlocking hole 36, or on the pivot of the gear itself so that it is not affected by the movement of that gear, but the slot 30 may also receive pins located on the other gear in any one of the three locations just specified.

In order that the path of movement of the free end of the link 28 may be shown graphically, this end is also preferably provided with an opening 38 in which a pencil or other suitable scribing means may be inserted to cause the path of movement of this free end of the link to be traced on paper.

As above pointed out, the holes 36 in the three gears are radially equidistant from the centers of the gears so that, when any two gears are placed on a common pivot in concentric relation to each other, the holes 36 in these two gears may be brought into register and the two gears interlocked to move in unison by inserting a pivot or other suitable pin through the two registering holes 36. Gear trains in which two of the gears are interlocked in the manner just described are shown in Figures 8 and 9. In Figure 8 the small gear 2 and the intermediate gear 4 are interlocked by a pin 40 passing through the registering holes 36 therein and are mounted on a common pivot, the small gear being located on the bottom next to the base 10 and the large gear 6 being located on a pivot so spaced from the pivot of the interlocked gears that it meshes with the lower small gear 2.

In Figure 9 the small gear 2 is shown as mounted on a common pivot with the large gear 6 and the registering openings 36 in the small gear 2 and the large gear 6 receive a locking pin 40 so that the small gear 2 and the large gear 6 turn in unison. As in Figure 8 the small gear 2 is shown below the large gear 6 and the intermediate gear 4 is shown as mounted on a pivot so spaced from the common pivot of the small gear 2 and the large gear 6 that the intermediate gear 4 meshes with the small gear 2.

Referring again to Figures 8 and 9, it will be seen that the gear arrangements there shown may be utilized to produce stroboscopic or moving picture effects, in order further to intrigue the interest of the child. If, for example, in Figure 8 a series of pictures or figures 41 be arranged on the large gear 6 near the gear teeth thereof, as shown in this figure, so that they will be exposed successively at the point 42 between the teeth of the gear 4 and these pictures or figures be so drawn as to portray successive changes in position, the gear teeth of the gear 4 will produce a shutter effect with the result that at the point 42 the child will get the impression of movement. If the handle hole 34 in the gear 6 be located so that it clears the teeth of the gear 4 as it passes the point 42, the desired rapidity of movement to produce the stroboscopic effect can be obtained by inserting a handle in the opening 34 of the gear 6 and effecting the rotation of the gears by turning this large gear 6 at the required speed.

The base 10 and gears 2, 4 and 6 may be made of any suitable material, either metal, wood or plastic. To permit the sale of the toy at prices which will put it within the reach of everyone, the toy is preferably made of some inexpensive material such as wood.

It is important, when the toy is to be used by small children that the gears should be light, e. g. of wood, plastic or hollow metal so that there is no flywheel or other force accumulating effect which could injure a child's fingers if it should get them between the intermeshing gears. Likewise the faces and edges of the teeth should be smooth so that if the child should get a finger between the teeth of intermeshing gears the pinching will be harmless and without abrasion or cutting of the skin. Moreover, the dimensions and the positions of the handle pins 24 in the holes 34 are such that no great amount of leverage is exerted which could result in injury to a finger thus caught between the gears.

From the foregoing description it will be seen that the invention provides a safe, inexpensive and educational toy producing effects which will both secure the child's attention, amuse it and at the same time teach it the principles of simple gearing, gear ratios and the physical laws of power multiplying gear trains.

What I claim is:

1. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy each gear also has therein a second hole at a common radial distance from the pivot hole therein and registrable with the corresponding holes in the other gears when on a common pivot, whereby any two of the gears may be pinned together through said holes for movement in unison.

2. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy the exposed faces of different gears are divided each provided with surfaces respectively of distinctive appearance in successive sectors, whereby the changing phase relations incident to the gear ratios are made graphically evident.

3. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy at least one of the gears is also provided with a hole remote from the pivot hole to receive a crank pin.

4. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy the base is circular, is of a diameter somewhat greater than that of the largest gear, is provided with a central pivot-receiving hole and with other pivot-receiving holes located near the periphery thereof and outside the periphery of the largest gear when the gears are concentrically stacked on said base to form a commercial unit, said peripheral pivot openings being symmetrically arranged about said central opening and being of substantially the same radii as the pivot pins, whereby to receive and retain said pivots in said commercial unit with a friction fit, and a pin having a sliding fit in the central pivot receiving holes of said gears and a press fit in the central opening of said base, for securing said gears in stacked relation on said base.

5. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy at least some of the pivot pins are of a length substantially greater than that of a single hole in a gear or in the base and at most equal to the sum of the depth of a hole in a gear plus that of a corresponding hole in the base, whereby, when the pin is inserted in a base pivot hole, the upper end of the pivot is at most flush with the upper face of the gear pivoted thereon.

6. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy the gears have both pivot holes and handle-receiving holes and which further comprises a link having at one end thereof a hole of size to fit a pivot or a crank pin and having intermediate between the ends thereof an elongated slot of a width to receive with sliding fit a pivot or a crank pin.

7. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy the gears have both pivot holes and handle-receiving holes and which further comprises a link having at one end thereof a hole to fit over a pivot or a crank pin and having intermediate between the ends thereof an elongated slot of a width to receive with sliding fit a pivot or a crank pin, said link having at its end remote from the crank pin or pivot receiving hole a second hole adapted to receive a scriber.

8. A toy comprising at least three intermeshable gears of differing radial dimensions and each having a central pivot-receiving hole, a base having pivot-receiving holes therein at various spacings, between centers, corresponding, respectively, to sums of the pitch radii of different pairs of said gears, and pivots removably fitting the holes in said base and the central holes of said gears, both being closely fitted and at least one having a free sliding fit and on which said gears may be mounted to turn in different intermeshing combinations and in which toy means are provided for tying together, for movement in unison on a common pivot, the smallest of said gears and one of the other two gears, whereby, when the tied-together gears are mounted upon a common pivot with the larger gear uppermost and are driven by the third gear, mounted on said base on another pivot arranged to bring it into mesh with the smallest gear, the interstices between the teeth of the larger of the tied-together gears may serve as stroboscopic openings, said driving gear having on its exposed face figures arranged concentrically about its axis at a radial distance therefrom such that these figures will be exposed successively through the said stroboscopic openings to give a motion picture or other desired effect.

9. A toy which comprises a base provided with a central hole for removably mounting a pin and a plurality of other pivot receiving holes, at least some of which are arranged in triplets with two spaced, center to center, from the third by distances respectively equal to the sum of pitch radii of two of the hereinafter mentioned gears, respectively, plus that of a third gear, a plurality of said gears each having a central hole for rotatably mounting it on a pivot, a pivot adapted for mounting in the central hole of the base and extending through central holes of said gears when coaxially stacked thereon, and a plurality of other pivots adapted for removably mounting in said other holes of said base and for extending with freely sliding fit into the central holes of said gears, all of said gears being of radius no greater than that of the base, whereby their teeth are protected by the base when they are mounted coaxially on the pin in the central hole, and said gears respectively being of progressively decreasing radii.

WALDEMAR AYRES.

REFERENCES CITED

The following references are of record in the file of this patent:

UNITED STATES PATENTS

| Number | Name | Date |
|---|---|---|
| 508,247 | Schwab et al. | Nov. 7, 1893 |
| 822,629 | Phillips | June 5, 1906 |
| 1,684,534 | Campbell | Sept. 18, 1928 |
| 1,912,094 | Plasterer | May 30, 1933 |
| 1,974,838 | Schmid | Sept. 25, 1934 |
| 2,075,033 | Garner | Mar. 30, 1937 |
| 2,095,046 | Wilner | Oct. 5, 1937 |
| 2,236,217 | Manuel | Mar. 25, 1941 |
| 2,245,110 | Marcaccio | June 10, 1941 |
| 2,360,536 | Avery | Oct. 17, 1944 |

FOREIGN PATENTS

| Number | Country | Date |
|---|---|---|
| 14,999 | Great Britain | 1911 |
| 180,126 | Great Britain | 1922 |
| 457,191 | Germany | 1928 |

OTHER REFERENCES

507 Mechanical Movements, Brown, 1901, pp. 12 and 28.

Chicago Apparatus Co., 1931, p. 52, item 380E.